June 5, 1928.  
C. A. HORNER  
1,672,458  
TOOL FOR REMOVING AND INSERTING SAW TEETH  
Filed Nov. 9, 1926
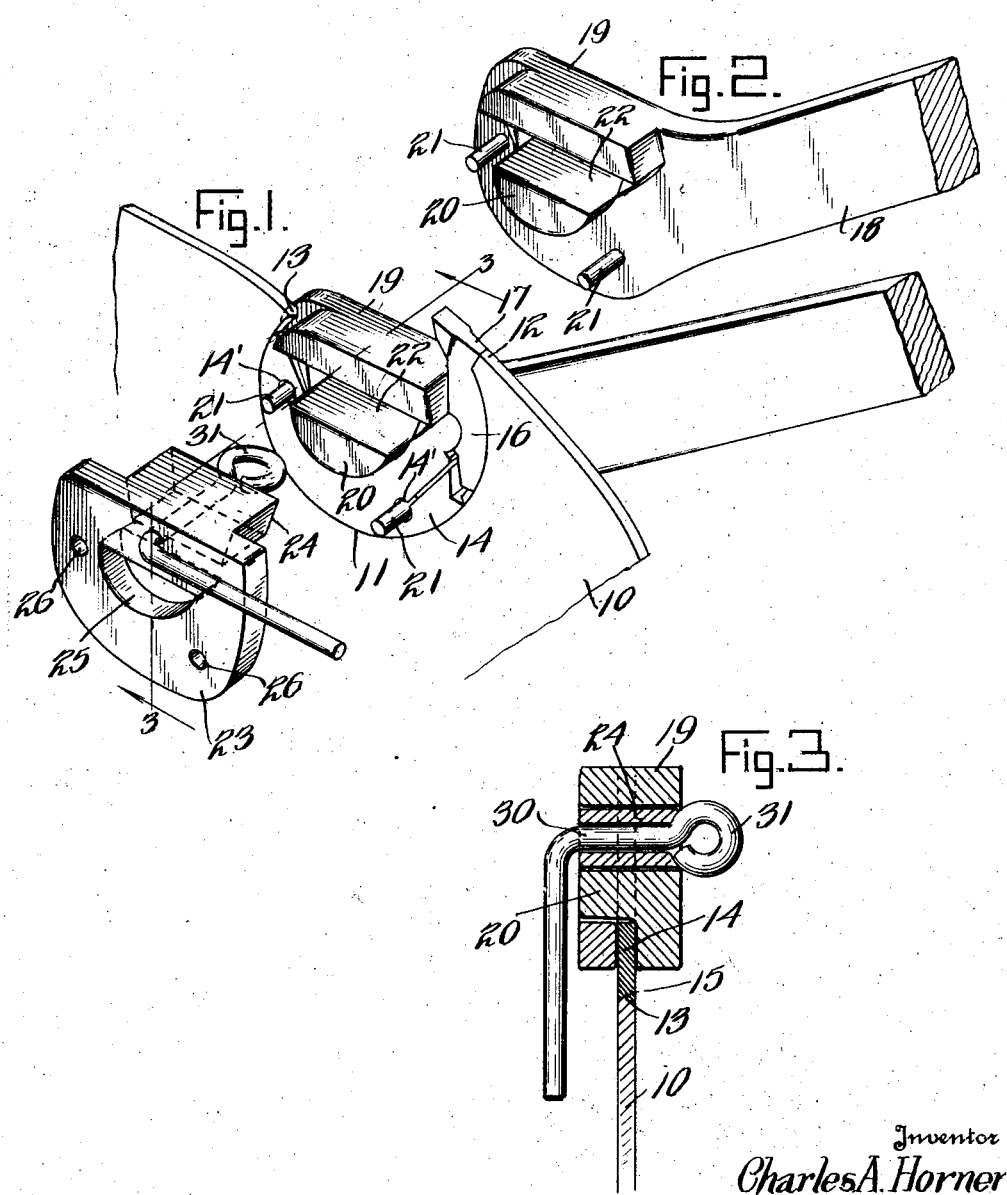
Inventor  
Charles A. Horner  
By  
Attorney Patented June 5, 1928.

1,672,458

UNITED STATES PATENT OFFICE.

CHARLES ASBURY HORNER, OF CLEVELAND, TENNESSEE.

TOOL FOR REMOVING AND INSERTING SAW TEETH.

Application filed November 9, 1926. Serial No. 147,285.

My said invention relates to a tool or wrench for removing and inserting saw teeth in circular saws and the main object of the invention is to provide a device of this character having a removable jaw to permit the operator to see how to apply the tool. A further object is to provide means for interlocking said removable jaw with the main body of the wrench.

Referring to the accompanying drawings which are made a part hereof and on which similar reference characters indicate similar parts, Figure 1 is a perspective of a fragment of a saw having an inserted tooth showing the method of applying the tool thereto, Figure 2, a perspective of a main portion of the tool, Figure 3, a section on line 3—3 of Figure 1.

In the drawings reference character 10 indicates a circular saw blade which is provided along its periphery with a plurality of tooth receiving openings 11 terminating in a shoulder or heel 12 at one end, said openings being substantially circular in shape and tapered along its margin at 13, as best shown in Figure 3. A locking member 14 is provided having its peripheral surface grooved at 15 to fit in said tapered opening or recess and having its inner end provided with portions adapted to engage a bit or tooth 16. Said bit 16 is provided with a heel 17 adapted to seat on the shoulder 12 of the saw blade and a groove extending from said shoulder along the back of the tooth for engagement with the saw blade. The locking member 14 is provided with one or more openings 14' for the reception of the pins of a wrench used in removing the tooth from the saw blade.

The above parts are of the usual construction, the bit or saw tooth being removable for replacement by a new tooth or for any other reason. In order to easily remove the bit and its locking member I provide a wrench comprising a handle 18 preferably formed integrally with an elongated body portion or shank 19. The shank 19 is provided with a laterally extending boss 20, also formed integrally with the shank and having a surface corresponding in shape to the inner surface or throat of the locking member.

The shank is provided with one or more pins 21 in proper spaced relation to engage the openings 14' in the locking member 14. The boss 20 is provided with a slot 22 extending across and through the same in substantially parallel relation to the longitudinal axis of the shank and I provide a removable jaw 23 having a boss 24 corresponding to the shape of the slot 22 and having a substantially semi-circular opening 25 adapted to receive the curved lower portion of the boss 20. The jaw is also provided with one or more openings 26 adapted to accommodate the pins 21 carried by the shank. These parts, when placed about a saw tooth, interlock and in order to hold them in such interlocked relation I provide a fastener 30 consisting of a bent rod or wire which extends through the jaw and has an eye 31 at its inner end of a size slightly larger than the slot through the boss 20. Said fastener is bent in a plane which is substantially the plane of the eye so that when the jaw is inserted in position the straight end of the fastener may be turned through an angle of 90 degrees to hold the parts together.

A feature of the invention is that in applying the improved device the operator may see how to insert the pins 21 through the openings in the locking member of the tooth and thereafter the jaw may be easily applied. This advantage obviates much time and pains in removing the saw tooth.

It will be obvious to those skilled in the art that various changes may be made in my device without departing from the spirit of the invention and therefore I do not limit myself to what is shown in the drawings and describe in the specification but only as indicated in the appended claims.

Having thus fully described my said invention, what I claim as new and desire to secure by Letters Patent, is:

1. A tool for removing and inserting saw teeth comprising a pair of jaws for engagement with opposite sides of a saw blade and having complementary interfitting boss sections, and means carried by one of said boss sections adapted to engage the remote side of the other boss section for holding the said sections together, substantially as set forth.

2. A tool for removing and inserting saw teeth comprising a pair of jaws for engagement with opposite sides of a saw blade and having complementary interfitting boss sections and means rotatably mounted in one of said boss sections and adapted to engage the other boss section for holding the said sections together, substantially as set forth.

3. A tool for removing and inserting saw teeth comprising a pair of jaws for engagement with opposite sides of a saw blade and having complementary interfitting boss sections and means carried by one of said boss sections and adapted to extend through and engage the remote side of the other boss section for holding the said sections together, said jaws being provided with complementary recesses and pins, substantially as set forth.

4. A tool for removing and inserting saw teeth comprising a pair of jaws of similar form for engagement with opposite sides of a saw blade and having complementary interfitting similarly formed boss sections, a handle carried by one of said jaws and means rotatably mounted in one of said boss sections adapted to extend through and engage the remote side of the other boss section for holding the said sections together, said jaws being provided with complementary formed pins and recesses, said pins being adapted to extend through a saw tooth, substantially as set forth.

5. A wrench for removing and inserting saw teeth comprising a pair of jaws for engagement with opposite sides of a saw blade, said jaws being of substantially the same general shape for engaging similar areas on the opposite sides of a saw blade and having cooperating overlapping laterally disposed portions for extending across a saw tooth, a handle associated with one of said jaws, and means for holding said jaws together, substantially as set forth.

6. A wrench for removing saw teeth comprising a pair of jaws, one of said jaws having a boss adapted to fit snugly within the throat of a saw tooth, the second jaw having a boss adapted to extend into the first-mentioned boss, and means for locking said jaws together in cooperative relation, substantially as set forth.

7. A wrench for removing and inserting saw teeth comprising a pair of jaws, laterally extending complementary bosses carried by said jaws, a recess in one of the jaws, and a pin carried by the other jaw and adapted to project through a saw tooth and into the recess in the opposed jaw, substantially as set forth.

In witness whereof, I have hereunto set my hand at Cleveland, Tennessee, this thirtieth day of October, A. D. nineteen hundred and twenty-six.

CHARLES ASBURY HORNER.